(12) United States Patent
Duan et al.

(10) Patent No.: US 11,687,782 B2
(45) Date of Patent: *Jun. 27, 2023

(54) SYSTEMS AND METHODS FOR RECOGNITION OF USER-PROVIDED IMAGES

(71) Applicant: Capital One Services, LLC, McLean, VA (US)

(72) Inventors: Yue Duan, Plano, TX (US); Chi-San Ho, Allen, TX (US); Micah Price, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,744

(22) Filed: Nov. 29, 2021

(65) Prior Publication Data

US 2022/0084171 A1 Mar. 17, 2022

Related U.S. Application Data

(63) Continuation of application No. 16/717,662, filed on Dec. 17, 2019, now Pat. No. 11,216,922.

(51) Int. Cl.
*G06N 3/08* (2023.01)
*G06T 5/00* (2006.01)
(Continued)

(52) U.S. Cl.
CPC .............. *G06N 3/08* (2013.01); *G06T 5/009* (2013.01); *G06T 7/90* (2017.01); *G06V 10/56* (2022.01);
(Continued)

(58) Field of Classification Search
CPC . G06T 5/009; G06T 7/90; G06T 2207/20081; G06N 3/08; G06N 5/003;
(Continued)

(56) References Cited

U.S. PATENT DOCUMENTS 9,354,265 B2 5/2016 Yamada et al.
10,140,553 B1 11/2018 Vasisht et al.
(Continued)

OTHER PUBLICATIONS

Przbylo Jaromir et al., "Using Deep Convolutional Neural Network for oak acorn viability recognition based on color images of their sections," Computers and Electronics in Agriculture 156 (2019), Dec. 12, 2018, pp. 490-499.
(Continued)

*Primary Examiner* — Xuemei G Chen
(74) *Attorney, Agent, or Firm* — Perkins Coie LLP (57) ABSTRACT

The present disclosure provides devices, systems and computer-readable media for identifying object characteristics using a machine learning model trained to de-emphasize brightness values. The machine learning model can be trained using modified training data. Modifying the training data can include converting the training data from an original color space into a color space having a brightness channel. The values of the brightness channel for the, training data can then be modified. After the values of the brightness channel are modified, the training data can be converted back into the original color space and used to train the machine learning model. A detection device can be configured with the machine learning model and used to identify object characteristics.

20 Claims, 3 Drawing Sheets

(51) Int. Cl.
*G06T 7/90* (2017.01)
*G06V 20/58* (2022.01)
*G06V 10/56* (2022.01)
*G06V 10/772* (2022.01)
*G06V 10/774* (2022.01)

(52) U.S. Cl.
CPC .......... *G06V 10/772* (2022.01); *G06V 10/774* (2022.01); *G06V 20/584* (2022.01); *G06T 2207/20081* (2013.01)

(58) Field of Classification Search
CPC .. G06N 3/0454; G06V 20/584; G06V 10/774; G06V 10/56; G06V 10/772
See application file for complete search history.

(56) References Cited

U.S. PATENT DOCUMENTS

| | | | |
|---|---|---|---|
| 10,319,116 | B1 | 6/2019 | C et al. |
| 10,321,022 | B2* | 6/2019 | Hata ................. H04N 23/56 |
| 10,332,245 | B1 | 6/2019 | Price et al. |
| 10,339,622 | B1 | 7/2019 | Tang et al. |
| 10,482,607 | B1 | 11/2019 | Walters et al. |
| 10,871,536 | B2 | 12/2020 | Golden et al. |
| 2007/0291336 | A1 | 12/2007 | Hsu et al. |
| 2009/0109234 | A1* | 4/2009 | Lee ..................... G09G 5/02 345/589 |
| 2011/0285913 | A1 | 11/2011 | Astrachan |
| 2014/0093168 | A1 | 4/2014 | Sasaki et al. |
| 2014/0152567 | A1 | 6/2014 | Chen |
| 2016/0300376 | A1 | 10/2016 | Fuse et al. |
| 2017/0098426 | A1 | 4/2017 | Won et al. |
| 2017/0127249 | A1* | 5/2017 | Li ..................... H04L 51/214 |
| 2017/0305434 | A1* | 10/2017 | Ratnasingam ........ B60W 50/14 |
| 2018/0182095 | A1 | 6/2018 | Li et al. |
| 2019/0014884 | A1 | 1/2019 | Fu et al. |
| 2019/0130545 | A1 | 5/2019 | Cardei |
| 2019/0164259 | A1* | 5/2019 | Lian .................... G06T 5/20 |
| 2019/0244334 | A1* | 8/2019 | Arakawa .............. G06T 1/00 |
| 2019/0355107 | A1* | 11/2019 | Aoki ................... H04N 5/445 |
| 2019/0370539 | A1* | 12/2019 | Shimamura .......... G06V 30/414 |
| 2020/0027249 | A1* | 1/2020 | Lough ................. G09G 5/02 |
| 2020/0250497 | A1 | 8/2020 | Peng et al. |
| 2021/0004936 | A1* | 1/2021 | Wang .................. G06T 3/4015 |
| 2021/0073953 | A1 | 3/2021 | Lee |
| 2021/0082354 | A1 | 3/2021 | Xiao |
| 2021/0160432 | A1 | 5/2021 | Yamamoto et al. |
| 2021/0166066 | A1* | 6/2021 | Ando .................. G06V 10/758 |

OTHER PUBLICATIONS

Diaz-Cely, Javier, et al. "The effect of color channel representations on the transferability of convolutional neural networks." Advances in Computer Vision: Proceedings of the 2019 Computer Vision Conference (CVC), vol. 11 (pp. 27-38). Springer International Publishing.

* cited by examiner

SYSTEMS AND METHODS FOR RECOGNITION OF USER-PROVIDED IMAGES

CROSS-REFERENCE TO RELATED APPLICATIONS

This application is a continuation of U.S. patent application Ser. No. 16/717,662, currently pending, which was filed on Dec. 17, 2019, the disclosure of which is expressly incorporated herein by reference in its entirety.

TECHNICAL FIELD

The present disclosure generally relates to methods and computer-readable media for evaluating user-provided image using machine learning models.

BACKGROUND

The performance of a machine learning model can depend on the similarity of the data analyzed by the model to the data used to train the model. Machine learning models used for image analysis, in particular, may perform poorly when analyzing images unlike those used to train the models. This characteristic of machine learning models may be a particular concern for applications in which users submit images for analysis. In such applications, the images submitted by the users may have been acquired under highly variable conditions, unlike the images used to train the machine learning model. Accordingly, such applications may exhibit poor accuracy during ordinary use.

SUMMARY in accordance with embodiments of the present disclosure, there is provided a system for object identification. The system includes at least one processor and at least one memory containing instructions hat, when executed by the at least one processor to perform operations to: obtain training data comprising image data of objects, the vehicle image data being in a first color space, and at least a portion of the vehicle image data being associated with vehicle characteristics; obtain a convolutional neural network model trained to identify at least one vehicle characteristic from vehicle image data in the first color space; convert the training data into a second color space, the second color space differing from the first color space, and the second color space comprising a brightness channel; modify the converted training data by modifying values of the brightness channel; reconvert the modified training data into the first color space; retrain the convolutional neural network model using the reconverted modified training data; and configure a detection system to use the retrained convolutional neural network to identify at least one object characteristic from object image data in the first color space.

In accordance with embodiments of the present disclosure, there is provided a device for vehicle identification. The device includes at least one processor and at least one memory containing instructions that, when executed by the at least one processor to perform operations. to: obtain image data of a object, the image data being in a first color space; convert the image data into a second color space, the second color space differing from the first color space, the second color space including a brightness channel; modify the converted image data by modifying values of the brightness channel; reconvert the modified image data into the first color space; identify at least one characteristic of the object using the reconverted modified image data and a machine learning model trained to identify at least one vehicle characteristic using training data comprising vehicle image data obtained in the first color space and modified in the second color space; and display an indication of the identified at least one characteristic.

In accordance with embodiments of the present disclosure, there is provided a non-transitory computer-readable medium containing instructions. The non-transitory computer-readable medium when executed by at least one processor, cause a device to perform object identification operations, comprising: obtaining image data of a object, the image data being in a first color space; converting the image data into a second color space, the second color space differing from the first color space, the second color space including a brightness channel; modifying the converted image data by modifying values of the brightness channel; reconverting the modified image data into the first color space; identifying at least one characteristic of the vehicle using the reconverted modified image data and a machine learning model trained to identify at least one object characteristic using training data comprising object image data obtained in the first color space and modified in the second color space; and displaying an indication of the identified at least one characteristic.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DESCRIPTION

In the following detailed description, numerous specific details are set forth in order to provide a thorough understanding of the disclosed example embodiments. However, it will be understood by those skilled in the art that the principles of the example embodiments may be practiced without every specific detail disclosed herein. Well-known methods, procedures, and components have not been described in detail so as not to obscure the principles of the example, embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

Reference will now be made in detail to the disclosed embodiments, examples of which are illustrated in the accompanying drawings.

The disclosed embodiments concern machine learning models used to identify objects in user-submitted images. Machine learning models can perform poorly when used with data differing from data used to the train the machine learning models. By training a model (or retraining an existing model) to rely more on information in images that varies less between training and user-submitted images, the accuracy of the machine learning model during ordinary use may be improved.

In particular, machine learning models can rely on brightness information in identifying objects in images. Such brightness information can include color parameters such as 'brightness', 'lightness', 'value', 'luma', and 'luminance' (e.g., as opposed to other color parameters such as hue, chroma, saturation, etc). But the brightness information in an image can depend on lighting conditions. User-submitted images may exhibit differing or more variable lighting conditions than the images used to train a machine learning model for image analysis. As a result, conventionally trained machine learning models may perform poorly at recognizing objects in the user-submitted images.

As disclosed herein, machine learning models trained to de-emphasize brightness information can provide improved performance in identifying objects in the user-submitted images. The machine learning models can be trained to de-emphasize brightness information using training images modified to convey less brightness information. Because the training images include less brightness information, the machine learning models may necessarily learn to rely on other information in the image (e.g., color information, shape information, or the like), in place of brightness information, in identifying objects in user-submitted images.

In some embodiments, the training images can be modified by converting them from an original color space in which color and brightness information are combined into another color space including an express brightness channel. The value of the brightness channel can be modified. The image can then be converted back to the original color space and used to train a machine learning model. In this manner, a machine learning model trained on images in the original color space can be trained to de-emphasize brightness information, even when the original color space lacks an express brightness channel. Additional advantages of the disclosed embodiments include retaining the original color space (which may be widely supported) and the ability to use machine learning models previously trained to identify objects in the original color space.

Accordingly, the disclosed embodiments provide a technical improvement over conventional methods of training machine learning models to recognize objects in user-submitted images.

Figure 1:
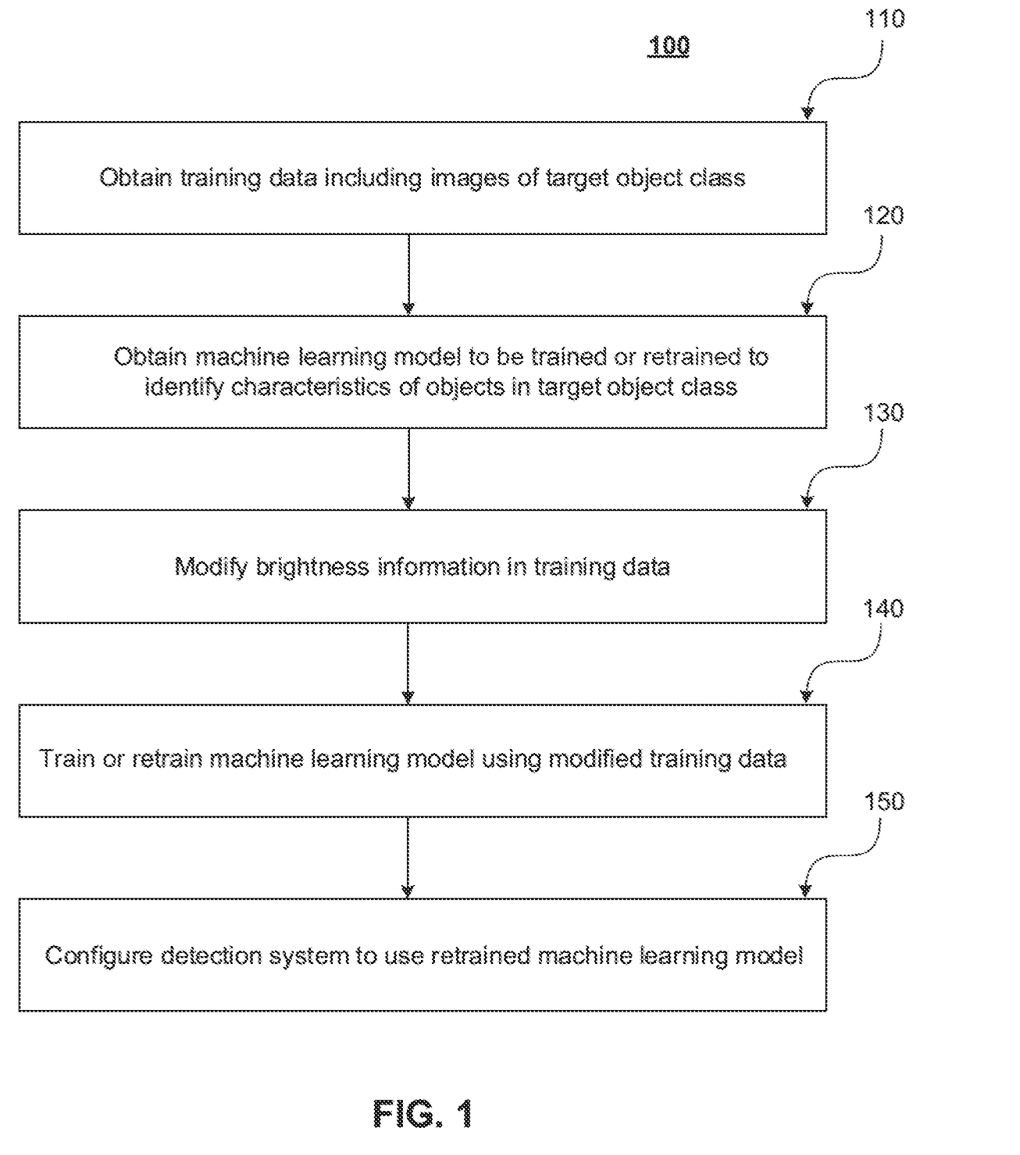
FIG. 1 depicts a flowchart of an exemplary method for training a machine learning model, consistent with disclosed embodiments.

FIG. 1, depicts exemplary computer-implemented process 100 for training a machine learning model, consistent with disclosed embodiments. The training process can be performed using one or more computing devices. The one or more computing devices can be configured with instructions (e.g., computer code) to perform the training. While the same computing devices are described as performing each step of process 100, for simplicity of description, different computing devices or groups of computing devices can be used to perform different steps (or different functions within each step). Consistent with disclosed embodiments, process 100 can include steps of obtaining a dataset including images of a target object class, modifying brightness information in training data (e.g., to de-emphasize the brightness information), retraining the machine learning model using modified training data, and configuring the detection system to use the retrained machine learning model.

In step 110 of process 100, the one or more computing devices can obtain training data, including images of a target object class, consistent with disclosed embodiments. For example, the training data can be received from one or more other systems or retrieved from a database, memory, or computer-readable medium accessible to the one or more computing devices. The training data can include video data or one or more still images. The training data can be used to train the machine learning models, as explained below in detail. In one example, the one or more computing devices can access training data 332 to obtain training data. Training data may include images in the target object class. For example, when the target object class is "vehicles", the training data can include images of vehicles. The training data can be in an original color space. The original color space can lack an express brightness channel (e.g., the training data can be in an RGB color space, or another color space lacking an express brightness channel).

At least some of the training data can be associated with labels, consistent with disclosed embodiments. The labels can provide a "ground truth" for training the machine learning model using the training data. The label associated with an image can include information regarding any objects in the image. As a non-limiting example, when the target object class is "vehicles", the labels for the images can specify, for any vehicle in an image, at least one of a make, model, trim, years color, or like characteristic of the vehicle in the image.

In step 120 of process 100, the one or more computing devices can obtain a machine learning model. The machine learning model can be generated by the one or more computing devices, received from another system, or retrieved from a database, memory, or computer-readable medium accessible to the one or more computing devices. In some embodiments, the, machine learning model may have been previously trained to identify object characteristics in images. For example, when the objects are vehicles, the object characteristics can be at least one of a make, model, year, trim, color, or like information of a vehicle in the image.

The machine learning model may have been trained to identify objects in the original color space, consisted with disclosed embodiments. In some embodiments, the machine learning model can be a convolutional neural network (CNN) (e.g., ResNet, ResNeXt, Inception, or another suitable architecture). The CNN can include multiple layers, each layer receiving inputs from one or more prior layers and providing outputs to one or more subsequent layers. The image can be input to the first layer. One or more output layers can provide indications of the object characteristics. In some embodiments, the machine learning model may be untrained. In such embodiments, process 100 can include training the model using the modified training data to identify objects in the target object class, consistent with disclosed embodiments.

In step 130 of process 100, the one or more computing devices can modify the training data to reduce brightness information, consistent with disclosed embodiments. Modifying the training data can include converting the training data from the original color space into a second color space. In some embodiments, the second color space, but not the original color space, may include a channel conveying brightness information. Once the training data is converted into the second color space, the value of the brightness channel can be modified. The modification can de-emphasize the information in the brightness channel. The training data can then be reconverted into the original color space.

The second color space can include an express brightness channel, consistent with disclosed embodiments. In some embodiments, the second color space can be a CIELAB, HSV, HSL, or like color space. Each of these color spaces has a brightness channel. For example, the CIELAB color space includes a lightness parameter, the HSV color space includes a value parameter, and the HSL color space includes a lightness parameter. Though the specific. perceptual definition of these channels may differ, and thus the specific values for the same pixel. in an image, these channels all represent the amount of light or balance of white and black in the pixel. The disclosed embodiments are not limited to a particular formula for converting the training data from the first color space to the second color space.

The one or more computing devices can be configured to modify the values of the brightness channel for the converted training data. Modifications to the brightness channel values can include setting the brightness channels to a predetermined value or scaling the values of the brightness channel. In some embodiments, modifications to the brightness channel values can be performed based on operational data. In various embodiments, images in the converted training data may be conditionally modified.

In some embodiments, the one or more computing devices can change the values of the brightness channel for each training image to a predetermined value. By overwriting the original values of the brightness channel, the brightness information is lost machine learning model trained on this modified training data must therefore use other information in the image to identify object characteristics. For example, a converted training image in a CIELAB color space can have a brightness channel. Each pixel of the converted training image can have a value of this brightness channel. The one or more computing devices can set these values to a predetermined value (e.g., 0, 127, 255, or the like when the value of the lightness channel is an unsigned 8 bit integer).

In some embodiments, the one or more computing devices can scale the values of the brightness channel for each training image. For example, as discussed above, a converted training image in a CIELAB color space can have a brightness channel. Each pixel of the converted training image can have a value of this brightness channel. As a non-limiting example, these values can be scaled according to the following formula:

$$v_{scaled} = \alpha v_{in} + (1-a)x$$

wherein $v_{scaled}$ is the scaled output value, $v_{in}$ is the input value, $\alpha$ is a scaling parameter, and x is a reference value (e.g., the minimum, maximum, or midpoint value of the brightness channel, or some other predetermined value). When $\alpha$ is zero, the input values are set to the reference value. When a is one, the input values are unchanged. In some embodiments, the value of $\alpha$ is less than one. For example, the value of $\alpha$ can be less than 0.5 or less than 0.1, or another suitable value. Other scaling formulas may be used, and the disclosed embodiments are not limited to a particular formula.

In some embodiments, modifications to the brightness channel values can be performed based on operational data. The operational data can include images obtained under the intended usage conditions of the machine learning model. In some embodiments, for example, the machine learning model may configure a detection system to identify vehicle characteristic. In such embodiments, the operational data can include images obtained by that detection system, or similar detection systems. In various embodiments, the machine learning model may be deployed as part of an application. The operational data can then include images obtained using the application. In some embodiments, the application may enable end-users to identify vehicle characteristics in images. The operational data can then include images obtained by end-users. in some embodiments, the operational data can include user-submitted images, images obtained during development or testing (e.g., during "dogfooding" of the model or of an application using the model), or other images obtained under the conditions in which the machine learning model is intended to be used.

In some embodiments, the operational data can be converted into the second color space. Modifications to the brightness channel values of the training data can then be determined based. on brightness values of the converted operational data. For example, the one or more computing devices can determine brightness characteristics of the converted operational data. These brightness characteristics can include the distribution of brightness values in the converted operational data or statistics of the brightness channel values in the converted operational data. For example, a function can be learned that converts the distribution of brightness values in the converted training data to at least an approximation of the distribution of brightness values in the converted operational data. This function can be applied to the brightness values in the converted training data images. As an additional example, the brightness values of the converted training data can be set to the mean brightness value for the converted operational data, or the mean brightness value and variance in brightness values can be used to scale the converted training data.

Brightness values for images in the training data may be conditionally modified, consistent with disclosed embodiments. In such embodiments, brightness values for an image in the converted training data may be modified when they satisfy a modification criterion. Satisfaction of the modification criterion can depend on the values of the brightness channel for the pixels in the image. For example, when an average brightness value for the pixels in the image falls outside a range of values the brightness values for the pixels in the image may be modified (e.g., by scaling them, setting them to a predetermined value, or the like). The modification criterion can be predetermined or based on operational data. For example, the range of acceptable brightness values in an image in the converted training data can be predetermined or can depend on the brightness values of the images in the operational data. In some embodiments, images in the converted training data can be discarded, rather than modified, when they do not satisfy the modification criterion.

After modifying the brightness information, the training data can be reconverted to the original color space. The disclosed embodiments are not limited to a particular formula for re-converting the training data from the second color space to the first color space.

Process 100 is not limited to performing steps 110 to 130 in a particular order. These steps may be performed contemporaneously, simultaneously, or sequentially. In particular, step 120 may be performed before or after either of steps 110 or 130.

In step 140 of process 100, after reconverting the training data, the reconverted training dataset with the modified brightness values can be used to train or retrain the machine learning model. In various embodiments, the one or more computing devices can be used to train an untrained machine learning model. In some embodiments, the one or more computing devices can be used to retrain a previously trained machine learning model. In such embodiments, the envisioned embodiments can transfer the expertise of the existing machine learning model (trained, in some embodiments, to identifying vehicle characteristics) to the related problem of identifying vehicle characteristics without relying on (or relying as heavily on) brightness information. Thus the disclosed embodiments enable use of existing machine learning models for identifying vehicle characteristics under variable lighting conditions and image quality conditions that differ from the lighting conditions and quality of images in the training data.

In step 150 of process 100, the one or more computing devices can configure a detection system to use the retrained machine learning model. The detection system can be used to identifies object characteristics in images obtained by the detection system. In some embodiments, because the machine learning model has been retrained to de-emphasize brightness information, the detection system may be able to identify object characteristics over a wider range of lighting conditions than a detection system using the original machine learning model.

Figure 2:
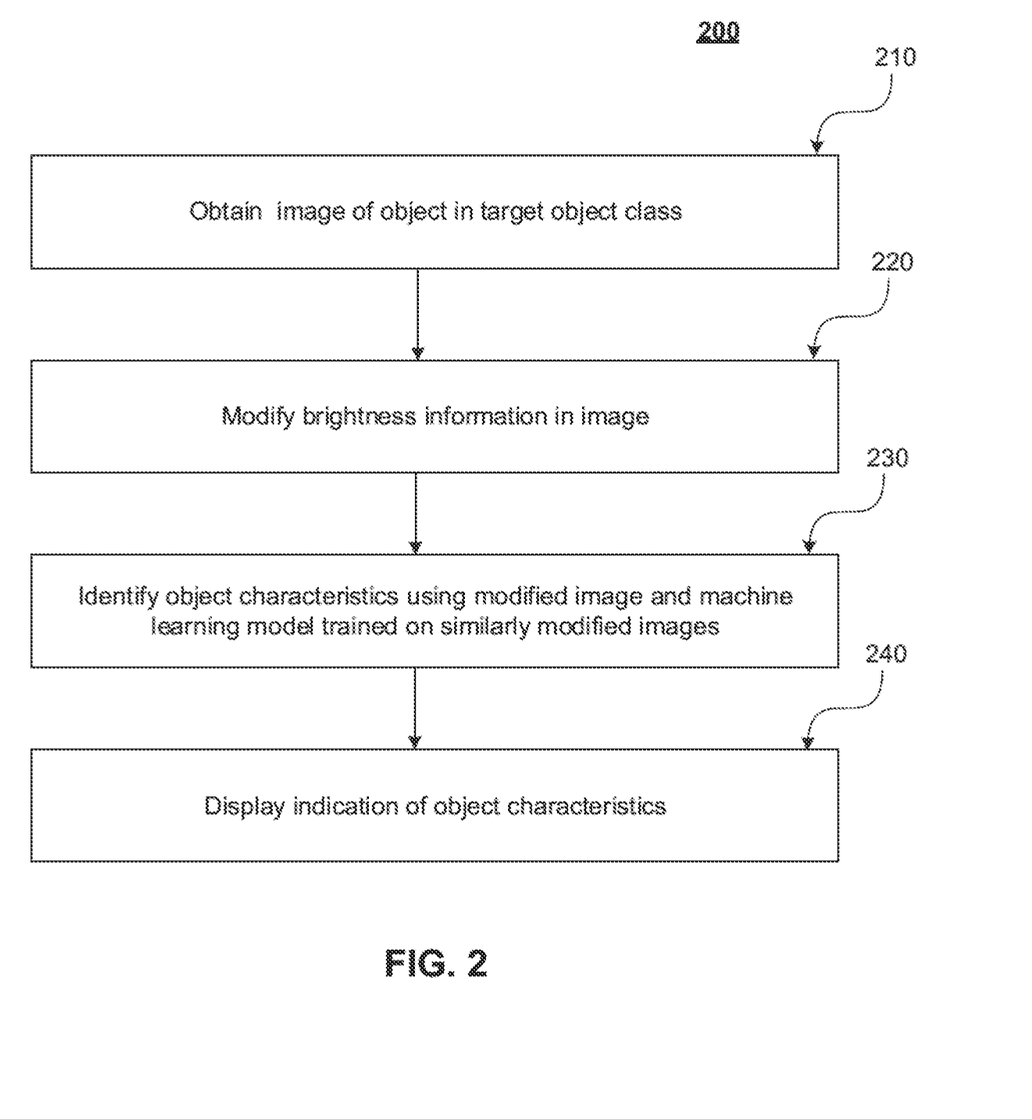
FIG. 2 depicts a flowchart of an exemplary method for identifying characteristics depicted in an image, consistent with disclosed embodiments.

FIG. 2 depicts an exemplary method 200 for identifying object characteristics, consistent with disclosed embodiments. In some embodiments, method 200 can be an operational counterpart to method 100. For example, in some embodiments, a machine learning model can be trained using method 100 and deployed for use in identifying object characteristics according to method 200. Method 200 can include the steps of obtaining an image of an object in a target object class, modifying the brightness information in the image, and identifying object characteristics using the modified image and a machine learning model trained on similarly modified images. In some embodiments, method 200 can be performed using a computing system (e.g., computing system 300 or the like). various embodiments, the computing system can be a mobile device with a camera (e.g., a smartphone, tablet, laptop, or other suitable model device).

In step 210 of process 200, the computing device can obtain image data of an object. The image data can be generated by the one or re computing devices, received from another device, or retrieved from a database, memory, or computer-readable medium accessible to the one or more computing devices. The image data can include one or more images. The image data can include video data or be extracted from video data. The image data can be in the original color space. As described herein, the original color space may not include an express brightness channel (es., the original color space may be an RGB color space, or the like). The image can include an object in a target object class. For example, when the machine learning model is trained to identify characteristics of vehicles, the object can be a vehicle.

In step 220 of process 200, the computing device can modify the brightness information. in the image. The modification can be similar to the modification described above with regards to step 130 of process 100. Modifying the image can include converting the image from the original color space into a second color space. In some embodiments, the second color space, but not the original color space, may include a channel conveying brightness information. Once the image is converted into the second color space, the value of the brightness channel for the image can be modified. The modification can de-emphasize the information in the brightness channel. The image can then be reconverted into the original color space.

Modifications to the brightness channel values for the image can include setting the brightness channel to a predetermined. value or scaling the values of the brightness channel, as described above with regards to step 130 of process 100.

In some embodiments, modifications to the brightness channel values can be performed based on the training data. Similar to the process based on the operational described above with regards to step 130 of process 100, modifications to the brightness channel values of the image can be determined based on brightness values of the converted training data. For example, the one or more computing devices may determine brightness characteristics of the converted training data. These brightness characteristics can include the distribution of brightness values the converted training data or statistics of the brightness channel values in the converted training. data. These brightness characteristics can be used to modify the image as described herein.

In various embodiments, brightness values for the image may be conditionally modified. In such embodiments, brightness values for the image can be modified when the pixels in the image satisfy a modification criterion, as described herein. The modification criterion can be predetermined or based on the training data. For example, the range of acceptable brightness values in the image can be predetermined or can depend on the brightness values of the images in the converted training data. After modification of the brightness values, the image can be reconverted to the original color space.

In step 230 of process 200, the computing device can use a machine learning model to identify object characteristics contained in the reconverted modified image. In some embodiments, the machine learning model may have been trained on training data modified in a manner similar to the reconverted modified image. For example, the machine learning model may have been trained or retrained using training data converted into the second color space, modified in the same manner as the reconverted modified image, and reconverted into the original color space. To continue this example, the brightness values for the reconverted modified image and the brightness values for the converted training data may have been set to predetermined values (e.g., the same predetermined values or different predetermined values), or similarly scaled. In some embodiments, the machine learning model can be the retrained machine learning model from step 140 of process 100. The reconverted modified image can be input to the machine learning model. Based at least in part on this input, the machine learning model can generate an indication of one or more characteristics of the object in the reconverted modified image. For example, when the image contains a vehicle, and the machine learning model is trained to identify characteristics of vehicles, the machine learning model can output indication of one or more vehicle characteristics identified in the image.

In step 240 of process 200, the computing device can display an indication of the one or more object characteristics. In some embodiments, the computing device can display the indication on a display of the computing device. In various embodiments, the computing device can provide instructions to display the indication on a display of another computing device. The indication can be textual or graphical. For example, the indication can be list of characteristics of the vehicle, or icons indicating the characteristics of the vehicle. The disclosed embodiments are not intended to be limited to any particular manner of displaying the object characteristics.

The disclosed embodiments are not limited to embodiments in which the image obtained by the computing device is modified as described with regards to step 220 of FIG. 2. In some embodiments, a computing device may identify characteristics of an object in an image using a machine learning model trained to de-emphasize brightness information, as described with regards to FIG. 1, without modifying the brightness information in the image as described with regards to FIG. 2.

The disclosed embodiments are not limited to embodiments in which the computing device uses a machine learning model retrained as described with regards to FIG. 1. In some embodiments, a computing device can be configured to modify an obtained image to resemble the training data used to train the machine learning model. For example, the computing device can be configured to modify the image as described with regards to step 220 of FIG. 2. The computing device can modify to image to have brightness characteristics similar to the brightness characteristics of the training data. For example the computing device can scale values of a brightness channel for a converted image based on the brightness characteristics of the converted training data. Such scaling can be conditional, depending on the difference between the brightness characteristics of the converted image and the brightness characteristics of the converted training data.

Figure 3:
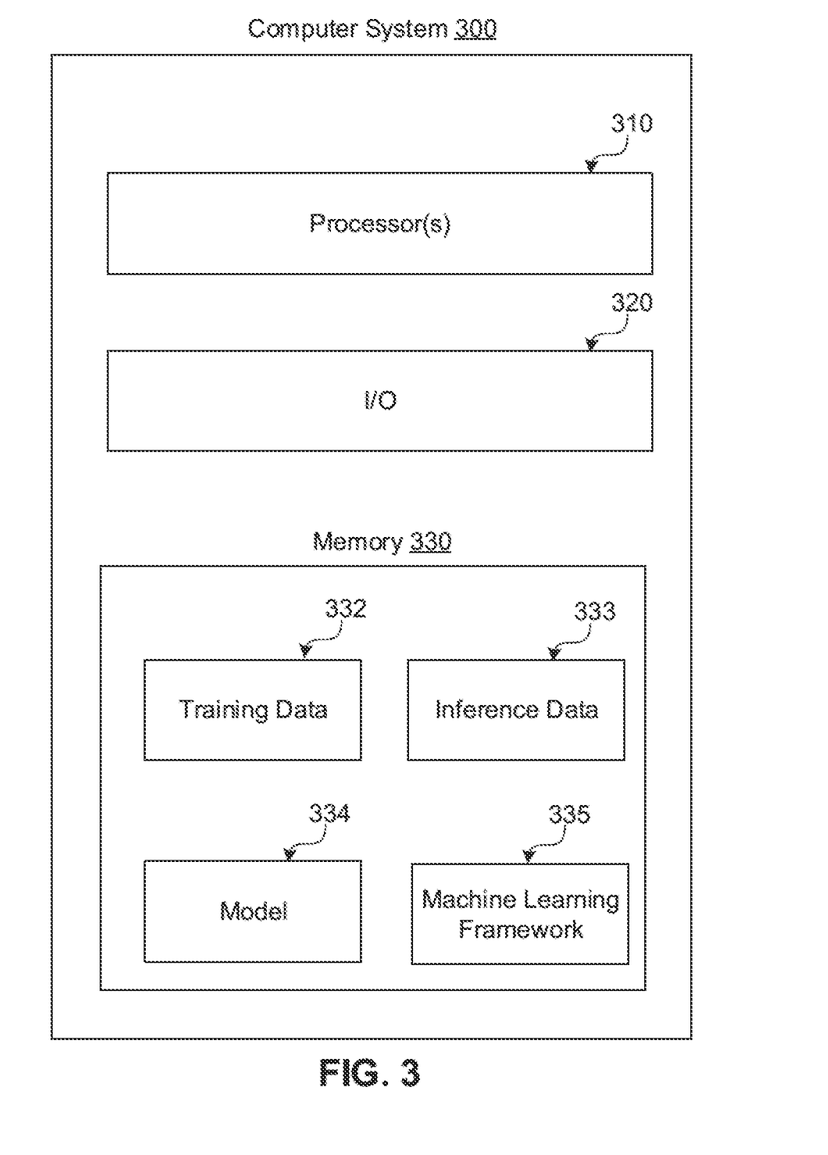
FIG. 3 depicts an exemplary system for implementing a machine learning model, consistent with disclosed embodiments.

FIG. 3, depicts an exemplary configuration of computing system 300. As will be appreciated by one skilled in the art, the components and arrangement of components included in computing system 300 may vary. For example, as compared to the depiction in FIG. 3, computing system 300 may include a larger or smaller number of processors, I/O devices, or memory units. In addition, computing system 300 may further include other components or devices not depicted that perform or assist in the performance of one or more processes consistent with the disclosed embodiments. The components and arrangements shown in FIG. 3 are not intended to limit the disclosed embodiments, as the components used to implement the disclosed processes and features may vary.

Processor 310 may comprise known computing processors, including a microprocessor. Processor 310 may constitute a single-core or multiple-core processor that executes parallel processes simultaneously. For example, processor 310 may be a single-core processor configured with virtual processing technologies. In some embodiments, processor 310 may use logical processors to simultaneously execute and control multiple processes. Processor 310 may implement virtual machine technologies, or other known technologies to provide the ability to execute, control, run, manipulate, store, etc., multiple software processes, applications, programs, etc. In another embodiment, processor 310 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor.

Processor 310 may execute various instructions stored in memory 330 to perform various functions of the disclosed embodiments described in greater detail below. Processor 310 may be configured to execute functions written in one or more known programming languages.

I/O device 220 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments.

I/O device 320 may be configured to manage interactions between computing system 200 and other systems using a network. In some aspects, I/O device 320 may be configured to publish data received from other databases or systems not shown. This data may be published in a publication and subscription framework (e.g., using APACHE KAFKA), through a network socket, in response to queries from other systems, or using other known methods. In various aspects, I/O 320 may be configured to provide data or instructions received from other systems. For example, I/O 320 may be configured to receive instructions for generating data models e.g.,. type of data model, data model parameters, training data indicators, training parameters, or the like) from another system and provide this information to machine learning framework 335. As an additional example, I/O 320 may be configured to receive data from another system (e.g., in a file, a message in a publication and subscription framework, a network socket, or the like) and provide that data to programs 236 or store that data in, for example, data set 332 or model 334.

In sonic embodiments, I/O 320 may include a user interface configured to receive user inputs and provide data to a user (e.g., a data manager). For example, I/O 320 may include a display, a microphone, a speaker, a keyboard, a mouse, a track pad, a button, a dial, a knob, a printer, a light, an LED, a haptic feedback device, a touchscreen and/or other input or output devices.

Memory 330 may be a volatile or non-volatile, magnetic, semiconductor, optical, removable, non-removable, or other type of storage device or tangible (i.e., non-transitory) computer-readable medium, consistent with disclosed embodiments. As shown, memory 330 may include data set 332, including one of at least one of encrypted data or unencrypted data. Memory 230 may also include models 234, including weights and parameters of neural network models.

Programs 236 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Machine learning framework 335 may be written in one or more programming or scripting languages. One or more of such software sections or modules of memory 330 may be integrated into a computer system, non-transitory computer-readable media, or existing communications software. Machine learning framework 335 may also be implemented or replicated as firmware or circuit logic.

Machine learning framework 335 may include programs (scripts, functions, algorithms) to assist creation of, train, implement, store, receive, retrieve, and/or transmit one or more machine learning models. Machine learning framework 335 may be configured to assist creation of, train, implement, store, receive, retrieve, and/or transmit, one or more ensemble machine learning models (e.g., machine learning models comprised of a plurality of machine learning models). In some embodiments, training of a model may terminate when a training criterion is satisfied. Training criteria may include number of epochs, training time, performance metric values (e.g., an estimate of accuracy in reproducing test data), or the like. Machine learning framework 335 may be configured to adjust model parameters and/or hyperparameters during training. For example, machine learning framework 335 may be configured to modify model parameters and/or hyperparameters (i.e., hyperparameter tuning) using an optimization technique during training, consistent with disclosed embodiments. Hyperparameters may include training hyperparameters, which may affect how training of a model occurs, or architectural hyperparameters, which may affect the structure of a model. Optimization techniques used may include grid searches, random searches, gaussian processes, Bayesian processes, Covariance Matrix Adaptation Evolution Strategy techniques (CMA-ES), derivative-based searches, stochastic hill-climbing, neighborhood searches, adaptive random searches, or the like.

In some embodiments, machine learning framework 335 may be configured to generate models based on instructions received from another component of computing system 300 and/or a computing component outside comprising system 300. For example, machine learning framework 335 can be configured to receive a visual (e.g., graphical) depiction of a machine learning model and parse that graphical depiction into instructions for creating and training a corresponding neural network. Machine learning framework 335 can be configured to select model training parameters. This selection can be based on model performance feedback received from another component of machine learning framework 335. Machine learning framework 335 can be configured to provide trained models and descriptive information concerning the trained models to model memory 334.

Exemplary Embodiments

The disclosed embodiments include applications for identifying vehicle characteristics. Such applications can run on a mobile device with a display and a camera. In some embodiments, the mobile device can be used to capture a picture or video of a vehicle. A machine learning model running on the mobile device can be configured to identify vehicle characteristics from the images or video. The display of the mobile device can display the identified vehicle characteristics. For example, a user can capture an image of a Tesla model 3. This image may be captured in a variety of environments e.g., inside or outside) at a variety of times (e.g., daytime or nighttime) in a variety of conditions (e.g., clear, rain, snow, etc.). The image can be input to the machine learning model, which can identify vehicle characteristics including the make (e.g., Tesla), the model (e.g., model 3), and other information, such as the year or trim. This information can then be displayed to the user. Operational data, in this context, can include, but is not limited to, images obtained using an application running on a mobile device under the various conditions described.

In some embodiments, data for training the machine learning model running on the mobile device can be received from dealerships, manufacturers, or the like. For example, images of vehicles can be scraped from public sources such manufacturer or dealer websites. As an additional example, images of vehicles can be received from dealers or manufacturers directly. As may be appreciated, such images can differ substantially from operational data, as described above. In particular, such images may exhibit different and more consistent lighting than images acquired by users of the application. By modifying the training data to de-emphasize brightness values, the machine learning algorithm can be trained (or retrained) to use information in the image other than brightness to identify vehicles characteristics. In some embodiments, the images acquired by the users can also be modified to de-emphasize brightness values.

Systems and methods disclosed herein involve unconventional improvements over prior methods of training and using machine learning models to analyze user-submitted images. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not. exhaustive and is not limited to the precise forms or embodiments disclosed. Modifications and adaptations of the embodiments will be apparent from consideration of the specification and practice of the disclosed embodiments. For example, the described implementations include software, but methods consistent with the present disclosure may be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including Javascript, C, C++, Java, PHP, Python, Ruby, Perl, or other programming or scripting languages. One or more of such software sections or modules can be integrated into a computer system, non-transitory computer-readable media, or existing communications software. The programs, modules, or code can also be implemented or replicated as firmware or circuit logic.

As used herein, the indefinite articles "a" and "an" mean "one or more" unless it is unambiguous in the given context. Similarly, the use of a plural term does not necessarily denote a plurality unless it is unambiguous in the given context. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A mobile device for object characteristic identification, comprising:
   at least one processor; and
   at least one memory containing instructions that, when executed by the at least one processor, cause the mobile device to perform operations comprising:
   obtaining image data of an object, the image data being in a first color space;
   converting the image data from the first color space to a second color space;
   modifying a value of a brightness channel of the converted image data, wherein modifying the value of the brightness channel comprises scaling the brightness channel value according to a formula having a summation of a scaled input brightness value and a scaled reference value, the scaled input brightness value and scaled reference value being scaled according to different scaling values;
   reconverting the modified image data to the first color space;
   identifying at least one object characteristic of the object using the reconverted image data and a machine learning model trained to identify the at least one object characteristic using training data comprising object image data obtained in the first color space and modified in the second color space; and
   displaying an indication of the identified at least one characteristic.

2. The mobile device of claim 1, wherein the image data of the object is obtained using a camera of the mobile device.

3. The mobile device of claim 1, wherein modifying the value of the brightness channel of the converted image data de-emphasizes brightness information in the converted image data.

4. The mobile device of claim 1, wherein modifying the value of the brightness channel of the converted image data is based on at least one of a distribution of brightness values of the training data or statistics of the brightness values of the training data.

5. The mobile device of claim 1, wherein the different scaling values comprise a scaling parameter and a difference between 1 and the scaling parameter.

6. The mobile device of claim 1, wherein the training data further comprises the object image data reconverted to the first color space after modification of a brightness value of the object image data.

7. The mobile device of claim 1, wherein the object is a vehicle.

8. The mobile device of claim 7, wherein the displayed indication of the identified at least one characteristic comprises an icon indicating a characteristic of the vehicle.

9. The mobile device of claim 1, wherein identifying the at least one object characteristic of the object using the reconverted image data and the machine learning model comprises deploying the machine learning model as part of an application at the mobile device.

10. The mobile device of claim 1, wherein the first color space does not include an express brightness channel.

11. The mobile device of claim 10, wherein the first color space is an RGB color space.

12. The mobile device of claim 1, wherein the second color space is one of a CIELAB, HSV, or HSL color space.

13. The mobile device of claim 1, wherein the machine learning model is trained to identify the at least one object characteristic using operational data obtained from multiple user devices.

14. A non-transitory computer-readable medium containing instructions that, when executed by at least one processor, cause a mobile device to perform object characteristic identification operations, comprising:
   obtaining image data of an object, the image data being in a first color space;
   converting the image data from the first color space to a second color space;
   modifying a value of a brightness channel of the converted image data, wherein modifying the value of the brightness channel comprises scaling the brightness channel value according to a formula having a summation of a scaled input brightness value and a scaled reference value, the scaled input brightness value and the scaled reference value being scaled according to different scaling values;
   reconverting the modified image data to the first color space;
   identifying at least one object characteristic of the object using the reconverted image data and a machine learning model trained to identify the at least one object characteristic using training data comprising object image data obtained in the first color space and modified in the second color space; and
   displaying an indication of the identified at least one characteristic.

15. The non-transitory computer-readable medium of claim 14, wherein the image data of the object is obtained using a camera of the mobile device.

16. The non-transitory computer-readable medium of claim 14, wherein identifying the at least one object characteristic of the object using the reconverted image data and the machine learning model comprises deploying the machine learning model as part of an application at the mobile device.

17. A method for object characteristic identification, comprising:
   obtaining image data of an object;
   identifying at least one object characteristic of the object using the image data and a machine learning model, wherein the machine learning model is trained to identify the at least one object characteristic based on training data comprising object image data that is:
      obtained in a first color space; and
      modified in a second color space by scaling a brightness channel value according to a formula having a summation of a scaled input brightness value and a scaled reference value, the scaled input brightness value and the scaled reference value being scaled according to different scaling values; and
   displaying an indication of the identified at least one characteristic.

18. The method of claim 17, wherein the object image data modified in the second color space de-emphasizes brightness information in the second color space.

19. The method of claim 17, wherein the object image data modified in the second color space is based on at least one of a distribution of brightness values of the training data or statistics of the brightness values of the training data.

20. The method of claim 17, wherein the different scaling values comprise a scaling parameter and a difference between 1 and the scaling parameter.

* * * * *